United States Patent [19]
Itoh

[11] Patent Number: 5,140,350
[45] Date of Patent: Aug. 18, 1992

[54] IMAGE FORMING APPARATUS FOR FORMING AN IMAGE WITH SMOOTH CURVED LINES

[75] Inventor: Tetsuya Itoh, Osaka, Japan

[73] Assignee: Minolta Camera Kabushiki Kaisha, Osaka, Japan

[21] Appl. No.: 529,599

[22] Filed: May 29, 1990

[30] Foreign Application Priority Data

May 30, 1989 [JP] Japan ................... 1-136740

[51] Int. Cl.⁵ ........................................ G01D 15/14
[52] U.S. Cl. ................................ 346/160; 358/298; 358/448; 358/453
[58] Field of Search ............... 346/160, 108; 358/401, 358/429, 447, 448, 452, 453, 455, 456, 457, 458, 459, 298

[56] References Cited

U.S. PATENT DOCUMENTS

| | | | |
|---|---|---|---|
| 3,249,690 | 5/1966 | Schubert | 358/455 |
| 4,179,684 | 12/1979 | Cheng | 358/429 X |
| 4,437,122 | 3/1984 | Walsh et al. | 358/447 X |
| 4,862,288 | 8/1989 | Sekiya | 358/298 |
| 4,878,068 | 10/1989 | Suzuki | 346/108 |
| 4,905,023 | 2/1990 | Suzuki | 346/108 |
| 4,937,591 | 6/1990 | Miyake et al. | 346/107 R |
| 4,958,218 | 9/1990 | Katayama et al. | 358/75 |
| 4,958,238 | 9/1990 | Katayuma et al. | 358/456 |
| 4,992,804 | 2/1991 | Roe | 346/108 |

FOREIGN PATENT DOCUMENTS

61-108256 5/1986 Japan.

*Primary Examiner*—Benjamin R. Fuller
*Assistant Examiner*—Randy W. Gibson
*Attorney, Agent, or Firm*—Burns, Doane, Swecker & Mathis

[57] ABSTRACT

An image forming apparatus for forming an image composed of an assembly of a large number of picture elements arranged in a matrix. The apparatus includes a detector for detecting whether or not each of the picture elements is positioned in a corner of the image and a correcting circuit for reducing the size of the picture element positioned on the corner of the image, so that the picture element on the corner of the image acts to improve the linkage between the picture elements in the peripheral portion of the corner.

10 Claims, 5 Drawing Sheets

35 DATA SELECTOR

IMAGE FORMING APPARATUS FOR FORMING AN IMAGE WITH SMOOTH CURVED LINES

BACKGROUND OF THE INVENTION

1. Field of the Invention

The present invention relates to an image forming device, in particular to an image forming device such as a laser printer or the like for forming a picture image composed of an assembly of a large number of picture elements arranged in a matrix.

2. Description of the Prior Art

A laser printer is hereinafter described as an example of an image forming device. Generally, in a laser printer, a laser beam for scanning is modulated to be applied or shut off dependently on image data so as to form an electrostatic latent image on a photoconductor drum. The latent image is caused to be visible through development with toner so that the visible image is transferred onto a printing sheet and then fixed (see U.S. Pat. No. 4,862,288 for example).

Since a laser printer is capable modulating laser beams at high speed, it is possible to perform printing of characters and symbols or recording of graphics of such as a postscript with high speed and high quality (i.e. high density) by using a laser printer. Accordingly, laser printers have been widely utilized as output devices for use in various data processing systems or image forming systems in recent years. With wide use of laser printers, it is required to form a smooth image line of a curved line and oblique line portion in a character or graphic figure with high quality.

In such a laser printer, however, since a picture image is formed of an assembly of a large number of picture elements arranged in a matrix, the picture elements located in a curved line or oblique line portion of a character or graph are arranged in a stepped manner so that the image of the curved line or oblique line can not be formed in smooth curved or straight line.

Therefore, in case the density of dots of the picture elements is low, the edge portion of an image is formed in the shape of saw teeth, resulting in deterioration of the quality and smoothness of an image of a character or figure.

Generally speaking, when an image is seen a distance of 12 inches away from the image, the resolution is one by three hundred inch. Therefore, if an image is formed with a dot density of picture elements higher than that of the above mentioned resolution, the above mentioned stepped image line of a curved and oblique line portion is observed to be smooth with good quality although the smoothness and quality of the image is dependent on the inclined angle to the arrangement of the picture elements in a matrix.

However, if the density of the dots of the picture elements is increased, the amount of the image data increases in proportion to the square of the density. Therefore, it becomes necessary to provide a large capacity memory for storing a large amount of image data. Moreover, it takes more time for processing the image in addition to taking much time compared to other processes with the result in that the image forming speed is furthermore lowered.

Moreover, with the high density of the picture elements, it is required to made the accuracy of the parts high, resulting in an increased cost increment.

SUMMARY OF THE INVENTION

The present invention has been made in order to solve the problem mentioned above and an object of the present invention is to provide an image forming device with improvement of quality and smoothness of an image of a character and graph without increasing the density of the picture elements.

More specifically, the present invention aims to provide an image forming device for forming an image composed of an assembly of a large number of picture elements arranged in a matrix, comprising detecting means for detecting whether or not each of the picture elements is positioned in a corner of the image and correcting means for reducing the size of the picture element positioned on the corner of the image.

According to an aspect of the present invention, the detecting means detects whether or not each of the picture elements is positioned in a corner of the image.

According to another aspect of the present invention, the correcting means reduces the size of the picture element positioned on the corner of the image.

According to a feature of the present invention, the picture element on the corner of the image acts to improve the linking between the picture elements in the peripheral portion of the corner.

The features of the present invention which are believed to be novel are set forth with particularity in the appended claims. The present invention together with further objects and advantages thereof may best be understood with reference to the following detailed description, taken in conjunction with the accompanying drawings.

BRIEF DESCRIPTION OF THE DRAWINGS

FIGS. 1 to 7 are views showing an embodiment according to the present, wherein

FIG. 1 is a schematic view showing a constitution of a laser printer,

FIG. 2 is an illustration for explaining a method of detecting an element on a corner of an image, FIG. 3 is a block diagram showing a correcting unit for correcting the corner, FIG. 4 is a circuit diagram showing an example of a data selector, FIG. 5 is an illustration showing an image of printing data signals for forming an image of an oblique portion, FIG. 6 is an illustration showing an oblique image actually formed by LD data signals obtained from the printing data signals of the image shown in FIG. 5, and FIGS. 7(a) to 7(c) are timing charts showing states and timings of the respective signals of the various parts in the laser printer when forming a part of the oblique image shown in FIG. 6.

DETAILED DESCRIPTION OF THE PREFERRED EMBODIMENT

A preferred embodiment of the present invention will be explained with reference to FIGS. 1 to 7.

Figure 1:
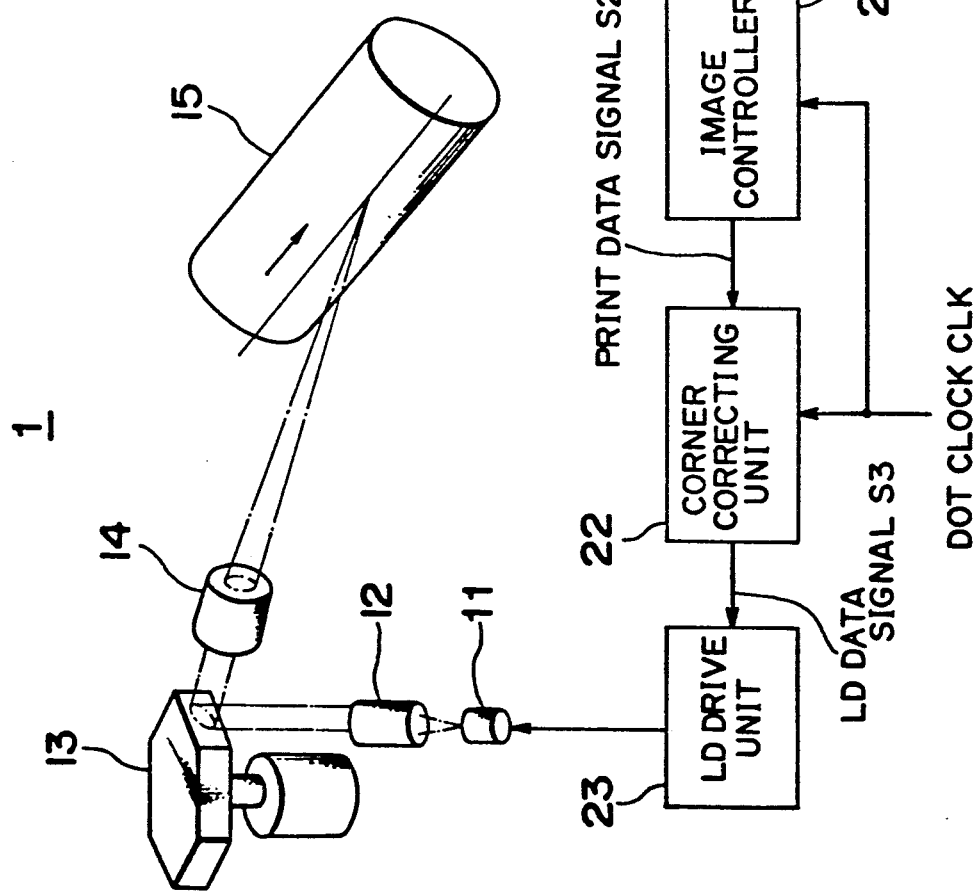

FIG. 1 shows a constitution of a laser printer 1 as an example of the embodiment according to the present invention.

As shown in FIG. 1, in the laser printer 1, there are provided a laser diode (referred to as LD hereinafter) 11 for emitting laser beams, a collimator lens 12 for collimating the the laser beams emitted from the LD 11, a polygon mirror 13 for reflecting the laser beams. The polygon mirror 13 is rotated by a motor in such a manner that the laser beams reflected on the polygon mirror 13 are applied to a photoconductor drum 15 subsequent to passing through a fθ lens 14 for scanning the surface of the photoconductor drum 15. The fθ lens 14 serves to focus the laser beams scanning on the the photoconductor drum 15 at uniform intensity. The laser printer 1 further comprises an image control unit 21 for generating a print data signal S2 synchronized with a scanning signal on the basis of the input image data signal S1, a corner correcting unit 22 which receives the print data signal S2 transmitted from the image control unit 21 and generates an LD data signal S3 based on the input print data signal S2, and an LD drive unit 23 which receives the LD data signal S3 transmitted from the corner correcting unit 22 and modulates the laser beams of the LD 11 on and off based on the input LD data signal S3 so as to control the drive of the LD 11, and other various parts (not shown).

Figure 6:
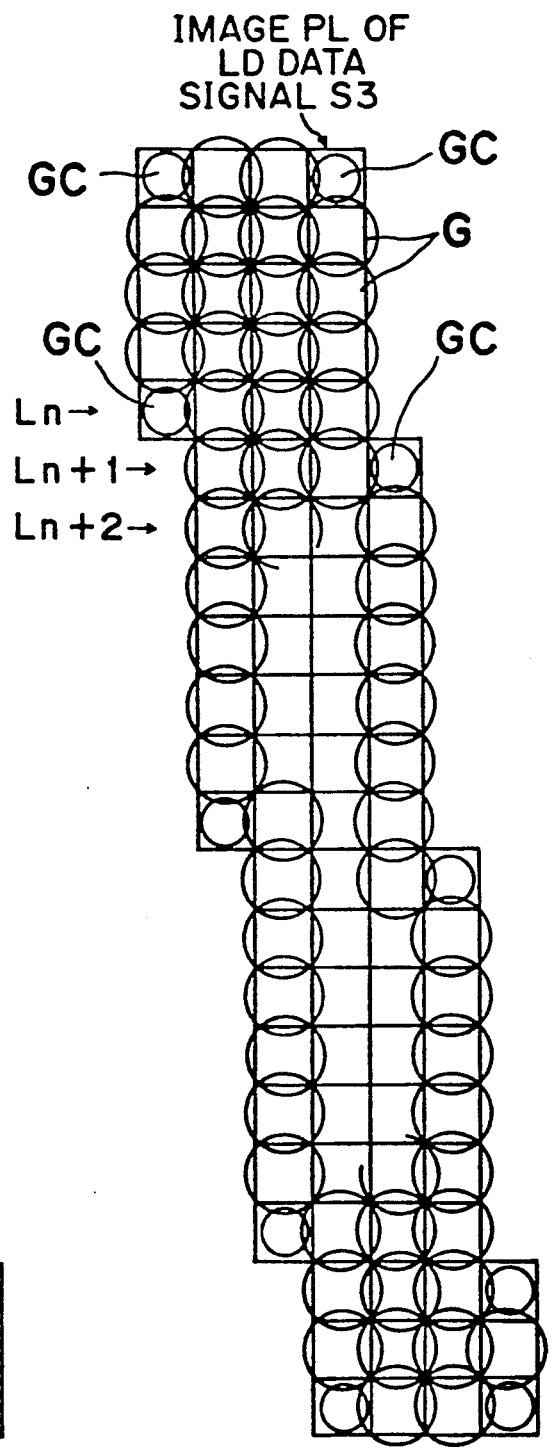
Figure 7:
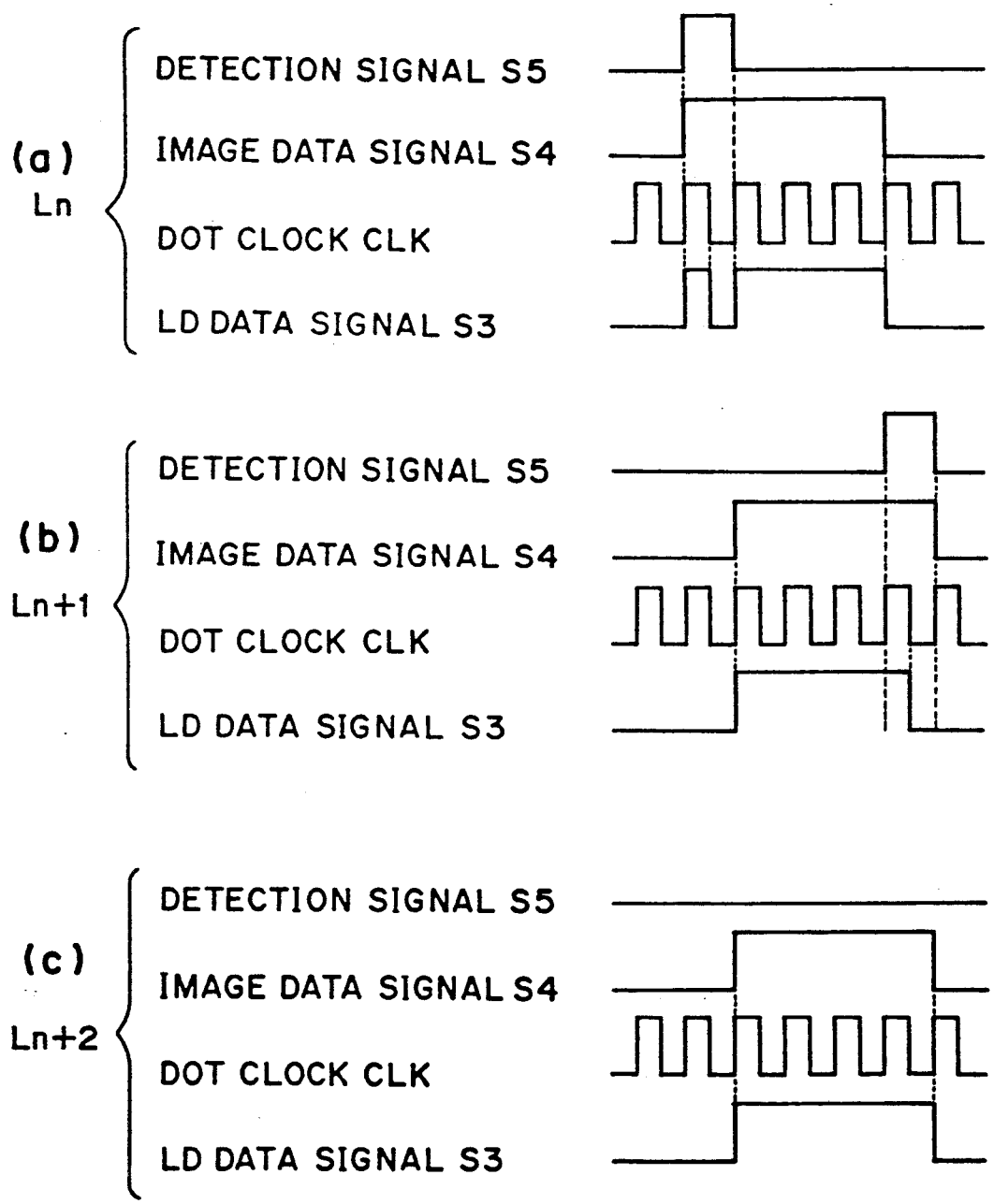

The corner correcting unit 22 is provided for detecting whether or not each of the picture elements G arranged in a matrix for forming an image is a corner picture element GC positioned on a corner of the image and for reducing the time period of emission of the laser beams from the LD 11 to the corresponding corner picture element GC (see FIG. 6).

The detection of the corner picture element GC is carried out in such a manner as following.

Figure 2:
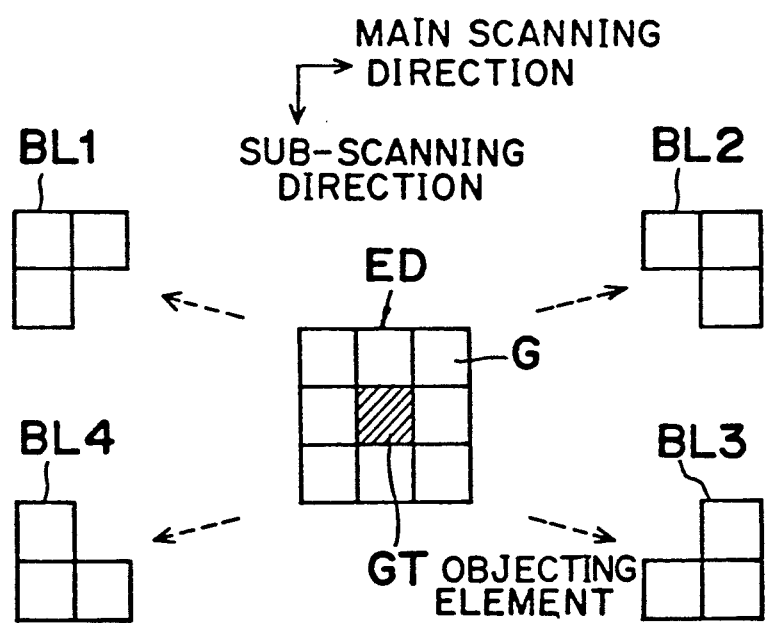

FIG. 2 is a view for explaining a method of detecting the corner picture element GC. In FIG. 2, there is shown a square detection area ED consisting of 3×3 picture elements in any portion of an image, wherein the center picture element positioned in the center dot of the detection area ED is referred to as an objecting picture element GT, and it is detected whether or not the objecting picture element GT is a corner picture element GC, in other words, it is judged whether or not the objecting picture element GT is positioned on a corner dot of the image.

With attention to blocks BL1 to BL4 composed of every three peripheral picture elements G seriated surrounding every two end sides of the objecting picture element GT adjacent to the objecting element GT, only when all of the three peripheral picture elements G seriated surrounding the objecting picture element GT in any one of the blocks BL1 to BL4 have no application of the laser beam (the state of the picture element G having no application of the laser beam is referred to as "0" state hereinafter) and at the same time the objecting picture element GT has an application of the laser beam (the state of the picture element G having an application of the laser beam is referred to as "1" state hereinafter), it is judged that the objecting picture element GT is a corner picture element GC.

Figure 3:
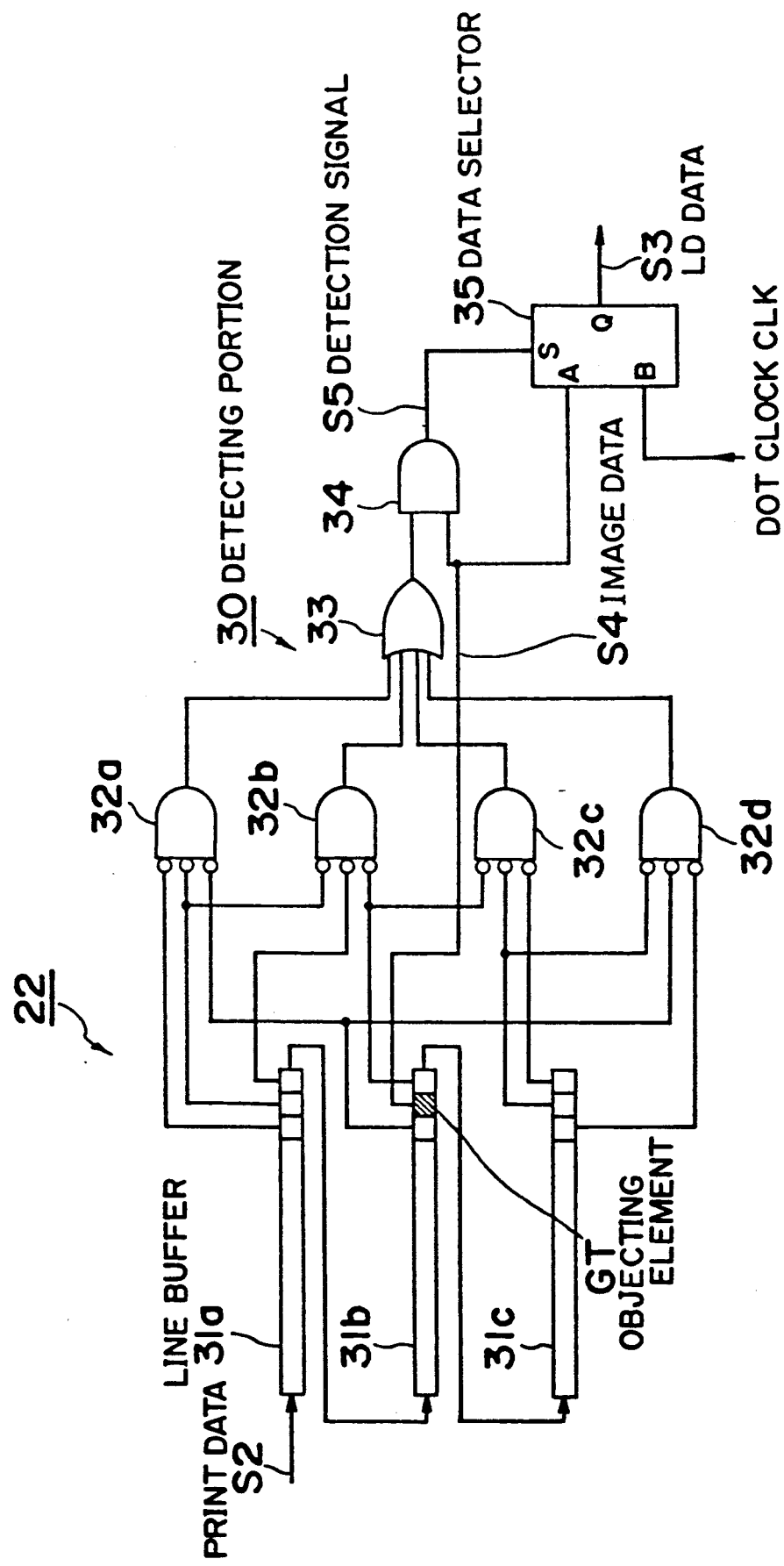

FIG. 3 shows a circuit arrangement of the corner correcting unit 22. The corner correcting unit 22 comprises first, second and third line buffers 31a, 31b and 31c each composed of shift register having a plurality of bits the number of which is same as that of the dots on one line in the main scanning direction of the image, four NAND gates 32a to 32d, an OR gate 33, an AND gate 34, and a data selector 35.

The line buffers 31a to 31c are connected in series and the print data signal S2 synchronized with the scanning signal is applied to the input port of the first line buffer 31a. Every three bits of the output sides of the respective line buffers 31a to 31c, i.e., (3×3=) nine bits in total, are allocated to the nine picture elements G of the detection area ED shown in FIG. 2 and the second bit situated in the second position from the output side of the second line buffer 31b is allocated to the objecting picture element GT. The output signals of the line buffers 31a to 31c having every three bits allocated to the respective three picture elements of the respective blocks BL1 to BL4 are transmitted to the respective three input terminals of the NAND gates 32a to 32d.

When the input signals of the NAND gates 32a to 32d each having three bits corresponding to the respective three picture elements of the blocks BL1 to BL4 are all "0" (low) levels, the output signals of the NAND gates 32a to 32d become "1" (high) levels. The output signals of the NAND gates 32a to 32d are applied to the input terminals of the OR gate 33.

The "OR" (logical sum) data of the outputs of the NAND gates 32a to 32d is generated from the output port of the OR gate 33 and the output signal of the OR gate 33 is applied to one of the two input ports of the AND gate 34. An image data signal S4 is transmitted from the second bit of the second line buffer 31b allocated to the objecting picture element GT to the other input port of the AND gate 34. Subsequently, the "AND" (logical product) data between the output of the OR gate 33 and the image data signal S4 corresponding to the objecting picture element GT is generated from the output port of the AND gate 34 as a detection signal S5.

Accordingly, if the objecting picture element GT is a corner picture element GC, the level of the detection signal S5 become "1" (high).

The detection signal S5 is transmitted from the output port of the AND gate 34 to the input terminal S of the data selector 35. If the level of the detection signal S5 is "0" (low), the data selector 35 selects the image signal S4 which is entered to the input terminal A of the data selector 35, on the other hand, if the level of the detection signal S5 is "1" (high), a dot clock signal CLK is selected to be applied to the terminal B of the data selector 35.

As described above, a detecting portion 30 for detecting a corner picture element GC comprises the line buffers 31a to 31c, NAND gates 32a to 32d, OR gate 33, and AND gate 34.

Figure 4:
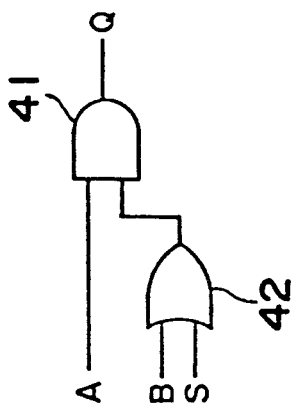

FIG. 4 shows an example of the data selector 35. As shown in FIG. 4, the data selector 35 can be composed of an AND gate 41 and an OR gate 42.

The dot clock signal CLK is a pulse signal having a duty factor of fifty percent synchronized with the image signal S4, i.e., synchronized with the read-out cycle of the 31a to 31c.

Accordingly, when the detection signal S5 is "0" (low), the pulse width of the LD data signal S3 generated from an output terminal Q of the data selector 35 is the same as that of the image data signal S4, and when the detection signal S5 is "1" (high), the pulse width of the LD data signal S3 is half of the width of the image signal data S4.

Figure 5:
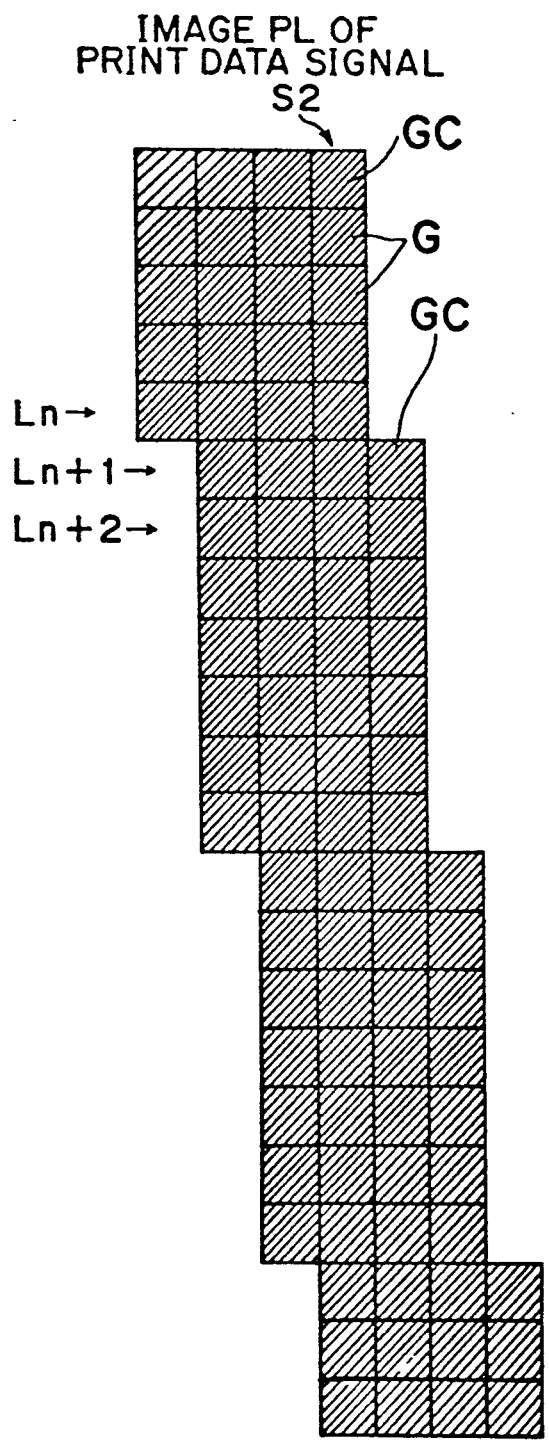

In FIG. 5, there is shown an image of the print data signal S2 for forming a picture image PL depicted by hatching and the value of the print data signal S2 for forming the image PL of the hatching portion is "1" (high).

FIG. 6 shows a picture image PL actually formed by the LD data signal S3 obtained through the corner correcting shown in FIG. 5. The value of the LD data signal S3 when forming a normal sized circular picture element is "1" and the value of the LD data signal S3 when forming a small circular picture element is "1" which represents a corner picture element GC.

FIGS. 7(a) to 7(c) show timing charts each showing the states of the respective signals on each of the lines $L_n$, $L_{n+1}$ and $L_{n+2}$ of the picture elements forming a part of the picture image PL of the hatching portion shown in FIG. 6. In the timing charts shown in FIGS. 7(a) to 7(c), there are shown image data signals S4 instead of showing a print data signal S2, having different timings but the same data contents each other.

As to be understood from the above description, when a corner picture element GC is detected, the detection signal S5 detecting the corner picture element GC becomes "1" and the data selector 35 selects the dot clock signal CLK and the pulse width of the LD data signal S3 becomes half of the width of the detection signal S5. Hereby, the time period of the application of the laser beam emitted from the laser diode 11 is reduced to be half so that the exposure intensity (exposure energy) of the laser beam onto the photoconductor drum 15 is reduced, whereby the portion corresponding to the corner picture element GC is printed with a half sized dot smaller than normal dots corresponding to normal picture elements.

Since the corner picture element GC is printed with smaller dots, the linkage of the peripheral picture elements seriated surrounding the corner picture element GC is improved and the smoothness of the entire part of the picture image PL of the hatching portion is improved. Moreover, since the corner correcting unit 22 has a simple structure and it is not necessary to increase the dot density of the picture elements in the laser printer, it is possible to provide an improvement in a low cost.

In the present embodiment, although the duty factor of the dot clock pulse CLK is set to be fifty percent, the pulse duty factor may be adjusted by using a frequency divider appropriately so that the most smooth image PL can be obtained. Moreover, the duty factor may be variable in accordance with a sort of an image such as characters, line image, solid image, color and size thereof. In addition, although the size of the corner picture element GC is reduced by reducing the laser emission time of the laser diode 11, the reduction of the size of the corner picture element GC may be performed by lowering the electric current flowing through the laser diode 11.

Moreover, in the present embodiment, other variations and modifications of the data selector 35 can be used and other ways or circuit arrangements can be utilized.

In addition, in the present embodiment, although the density of picture elements of a corner portion of an image is adjusted by a one time of exposure per one scanning line using a laser head, the intensity of the picture element positioned on the corner of the image can be adjusted by using a solid state scanning type printing head such as an LED array, liquid crystal shutter array or PLZT shutter array as follows.

In concrete, there are provide a first line buffer for applying a first exposure data based on the image data of the printing data fed from the image control unit and a second line buffer for applying a second exposure data as a data of density for adjusting the density of the picture elements based on the image data of the objecting picture element and on the image data of a plurality of serial picture elements surrounding the objecting picture element, so that, when the printing data stored in the second line buffer is shifted, the kind of the image formed of the respective picture elements is detected and stored. Subsequently, the first exposure is carried out based on the first exposure data in the same manner as directed by the printing data, thereafter the second exposure is carried out by the second exposure data for adjusting the density of the picture elements corresponding to the relation between the respective picture elements and the adjacent picture elements. Herein, the second exposure may be performed during the data process for the first exposure or at the same time of the first exposure. In the case the second exposure is performed at the same time of the first exposure, the exposure of the printing head may be performed one time per one scanning line by an output of the sum of the first and second exposure amounts.

The present invention can be adapted to laser printers other than that of the present embodiment described above, and to another kind of printers in which the size of the picture elements can be varied, or to an image forming apparatus other than a printer.

According to the present invention, the quality and the smoothness of characters and graphic figures can be improved without increasing the density of the dots of the picture elements.

What is claimed is:

1. An image forming apparatus for forming an image of an assembly of a large number of picture elements arranged in a matrix comprising:
    light emitting means for emitting light beams on and off every picture element of said large number of picture elements based on image data of said large number of picture elements;
    detecting based on said image data, means for detecting whether or not each of said large number of picture elements is a picture element positioned on a corner of the image; and
    correcting means for adjusting output of said light emitting means based on the detection result of said detecting means and correcting a size of said corner picture element positioned on the corner of said image to be reduced with respect to a normal size of other picture elements.

2. The image forming apparatus as defined in claim 1, wherein said detecting means comprises line memory means for storing data of a center picture element positioned on a central portion of any one of a plurality of matrixes of said large number of picture elements and data of a plurality of peripheral picture elements seriated surrounding said center picture element, including logic circuit means for generating the data of the logic sum of a image data signals of said peripheral picture elements and a data of a logic product between an image data signal of said center picture element and the image data signals of said peripheral picture elements, wherein said detecting means detects that said center picture element is a corner picture element positioned on a corner of said image when each of said peripheral picture elements has no light emission applied by said light emitting means.

3. The image forming apparatus as defined in claim 1, wherein said correcting means reduces an light emission time of said light emitting means to a corner picture element positioned on a corner of said image when said detecting means detects that the center picture element is the corner picture element positioned on the corner of said image.

4. The image forming apparatus as defined in claim 3, wherein said light emitting means comprises drive means for driving an the emission of said light emitting means by modulating said light emitting means on and off.

5. An image forming apparatus for forming an image composed of a large number of picture elements arranged in a matrix through a process of forming an electrostatic latent image on a photoconductor member, comprising:
   drive means for driving a laser light source for generating a laser beam that applies a light beam onto said photoconductor member in order to produce said latent image;
   means for applying a pulse signal based on an image data of said large number of picture elements to said drive means;
   memory means for storing data, from said image data, of any one picture element among the large number of picture elements of said image and data, from said image data, of peripheral picture elements seriated surrounding said picture element;
   judging means for judging whether or not each of the picture elements of which the image data are stored in memory means has laser light emission applied, said judging means generating a detection signal for representing a center picture element to be a corner picture element positioned on a corner of said image when said judging means determines that only said center picture element is a picture element having a light emission applied; and
   pulse width changing means for changing a pulse width of said pulse signal to be applied to said drive means in response to said detection signal generated from said judging means.

6. The image forming apparatus as defined in claim 5, wherein said pulse width changing means reduces the pulse width of said pulse signal when said judging means judges that said center picture element is a corner picture element positioned on a corner of said image.

7. The image forming apparatus as defined in claim 6, said pulse width changing means comprises a logic circuit composed of an AND gate and an OR gate.

8. An image forming apparatus for forming an image composed of a large number of picture elements arranged in a matrix through a process of forming an electrostatic latent image on a photoconductor member, comprising:
   drive means for driving a light source for applying a light beam onto said photoconductor member;
   image control means for applying a drive data signal corresponding to an image data of said large number of picture elements to said drive means;
   judging means for judging whether or not each of said large number of picture elements is a corner picture element positioned on a corner of said image said judging means providing an output indicating a result of said judging and
   image data selecting means for selecting any one of a plurality of drive data signals, one of said plurality of drive data signals having a first duty factor same as a duty factor of the image data signal and one of said plurality of drive data signals having a drive data signal of a second duty factor different from said duty factor of the image data signal, and applying one of said drive data signals selected of the selecting means to said image control means.

9. The image forming apparatus as defined in claim 8, wherein said detecting means comprises line memory means for storing data of a center picture element positioned on a central portion of any one of a plurality of matrixes of said large number of picture elements and data of a plurality of peripheral picture elements seriated surrounding said center picture element and comprises logic circuit means for generating a data of a logic sum of the image data signals of said peripheral picture elements and the data of a logic product between the image data signal of said center picture element and image data signals of said peripheral picture elements, wherein said detecting means detects that said center picture element is a corner picture element positioned on a corner of said image when each of said peripheral picture elements has no light emission applied by said light emitting means.

10. The image forming apparatus as defined in claim 8, wherein said second duty factor is half of said first duty factor.

* * * * *